Nov. 5, 1968　　　　W. A. SCHAICH　　　　3,408,692
APPARATUS FOR PRODUCING OFFSET FINISH ON CONTAINERS
Filed May 21, 1965　　　　　　　　　　　　　2 Sheets-Sheet 1

INVENTOR.
WILBUR A. SCHAICH
BY
ATTORNEYS

Nov. 5, 1968  W. A. SCHAICH  3,408,692
APPARATUS FOR PRODUCING OFFSET FINISH ON CONTAINERS
Filed May 21, 1965  2 Sheets-Sheet 2

INVENTOR.
WILBUR A. SCHAICH
BY
ATTORNEYS

United States Patent Office 3,408,692
Patented Nov. 5, 1968

3,408,692
APPARATUS FOR PRODUCING OFFSET FINISH ON CONTAINERS
Wilbur A. Schaich, Maumee, Ohio, assignor to Owens-Illinois, Inc., a corporation of Ohio
Filed May 21, 1965, Ser. No. 457,579
4 Claims. (Cl. 18—5)

ABSTRACT OF THE DISCLOSURE

Apparatus is provided for making containers having offset finishes by utilization of a free extrusion process. The finish-defining portion of an extruded tubular parison is shifted to its final location in response to the closing movement of a pair of separable blow mold sections.

---

In the art of blow molding articles, such as containers, one generally accepted method is typically identified as the "free extrusion" technique wherein a freely pendant tube of plasticized plastic material (which forms the parison from which the container is to be blown) is issued downwardly from an overhead extrusion nozzle. The free lower end of the tube is issued vertically between the opened sections of a separable blow mold incorporating therein finish-defining recesses.

In order to introduce air into the extruded tubular parison, a blow pin or the like is inserted into the free lower end of the tube, or the parison tube is extruded directly over such a blow pin. The pin thus aids in positioning the parison tube in registry with the finish-defining recesses of the blow mold sections, so that closure of the blow mold sections onto the tube accommodates the entry of blow air into the tube from the blow pin.

This basic technique is acceptacle to a great variety of different specific operating techniques. For example, the blow pin may be carried by a vertically movable table, and the blow molds are carried by the table for vertical movement therewith relative to an overhead extrusion nozzle. Thus, by moving the table and the associated blow pin and blow mold sections away from the extrusion nozzle after severance of a first parison from the nozzle, the continued extrusion of the tubular parison for the next successive article formation is accommodated during blowing of the first parison. Other variations to accomplish the same purpose may include the utilization of a rotatable table carrying a plurality of blow mold sections defining separate blow molding stations, successively alignable with thhe extrusion orifice.

Since, in substantially all of these variations, the blow pin must enter the free lower end of the extruded tubular parison as it depends vertically from the extrusion nozzle, the conventional "free extrusion" manufacturing techniques are not adaptable to the manufacture of articles having "offset finishes," i.e. a container wherein the finish or neck is eccentric to the body of the container. The basic difficulty, of course, lies in the fact that the tube must be entrapped in the blow mold along substantially the centerline of the over-all container in order that a container of acceptable wall thickness can be obtained without utilization of excess material. Thus, the misalignment of the finish with the remainder of the container means that the blow pin or blow tube must be similarly misaligned. Various expedients have been suggested, incorporating complicated blow pin shifting mechanisms or blow mold shifting mechanisms which must be moved by accurate timing mechanisms for relatively eccentrically disposing the blow tube and the blow molds.

The present invention proposes a new and novel apparatus for producing containers or the like articles having offset finishes and wherein the closing motion of the blow mold sections onto the extruded tubular parisor shifts the blow pin so that it is disposed eccentrically with respect to the body-defining portions of the blow molć section and so that the lower extremity of the extrudec tubular parison is in accurate registry with the finish-defining recesses of the blow molds.

To accomplish this result, various mechanical means can be utilized, preferably a camming mechanism interconnecting the blow mold sections and the portion of the mechanism engaging the lower end of the pendant tube. Where the blow pin is carried by a vertically movable table, such a camming mechanism includes a pair of arcuate cam slots in the upper surface of the blow table and a pair of cam pins or rollers located on the underside of the blow molds and entered in the slots. Thus, by actuating the blow mold sections toward their closed positions, the cam pins movable with the blow molds and engaged in the table slots, shift the table and the blow pin carried thereby into registry with the finish-defining recesses. Alternatively, only the lower end of the tube may be engaged by the table for cammed movement into registry with a blow pin which is subsequently inserted into the tube.

It is, therefore, an important object of the present invention to provide an extremely simple, inexpensive and positively acting means for and method of producing a container having an offset finish by utilization of a free extrusion blow molding machine.

Another important object of this invention is the provision of an apparatus for producing an offset finish container from a freely pendant, vertically disposed tubular parison by displacing one free end of the parison in response to actuation of a pair of blow mold sections to their parison-engaging positions.

Another important object of the present invention is the provision of an apparatus for the manufacture of offset finish containers in a blow molding machine in which a parison is extruded vertically, by cam means interconnecting a pair of separable blow mold sections and a parison-engaging element, the cam means being effective to shift the element and the portion of the parison engaged thereby from a truly vertical position as the blow mold sections are closed on the parison.

Yet another, and no less important, object of the present invention is the provision of apparatus for making an offset finish container by transversely deflecting the free end of an extruded parison into registry with finish-defining surfaces of a blow mold in response to closure of the blow mold upon the parison.

Other objects of this invention will appear in the following description and appended claims, reference being had to the accompany drawings formign a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
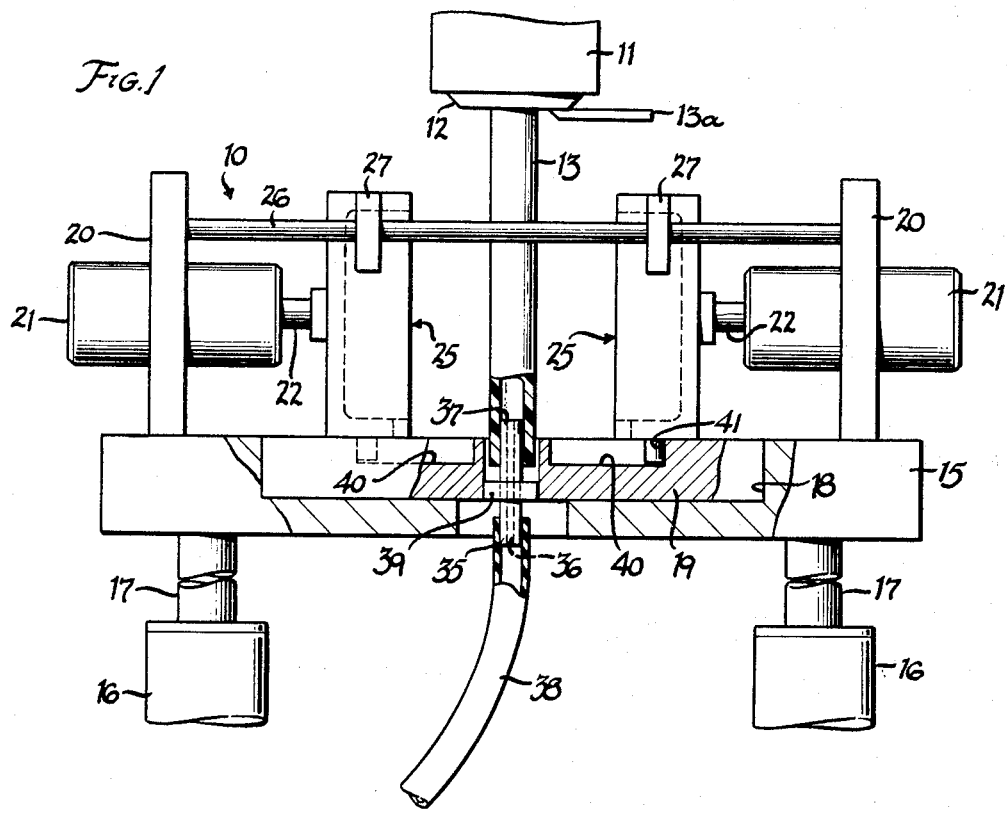
FIGURE 1 is a fragmentary side elevational view, with parts broken away in section, of a free extrusion blow molding machine utilizing apparatus of the present invention to carry out the method of the present invention.
Figure 2:
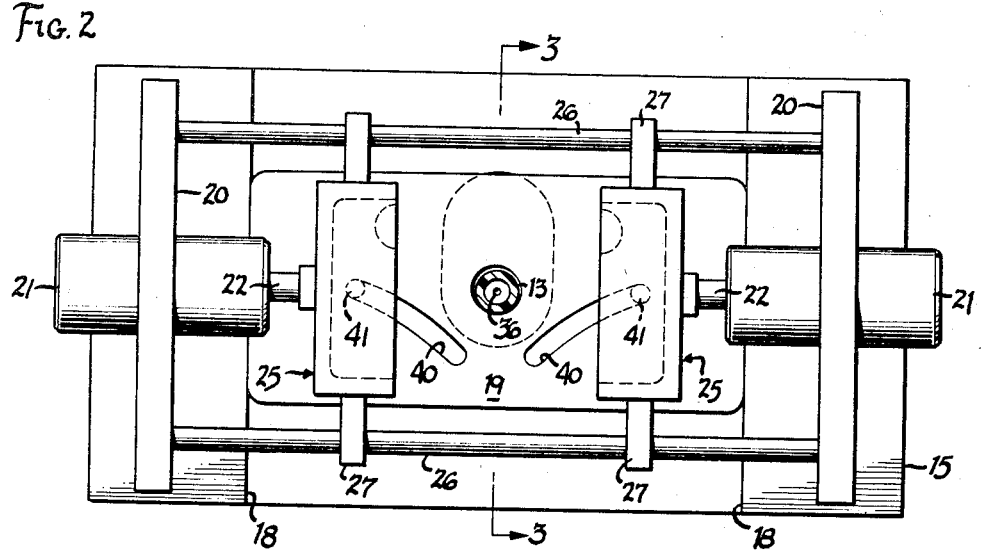
FIGURE 2 is a plan view of a major portion of the machine illustrated in FIGURE 1 of the drawings.

As shown on the drawings, in FIGURE 1 reference numeral 10 designates generally a blow molding machine of the present invention and including an extruder 11 provided with a downwardly directed extrusion nozzle 12 capable of issuing a freely pendant, vertically extending tube or parison 13 in a condition of plasticity sufficient to accommodate the blowing thereof to a final configuration. The pendant tube 13 depends from the nozzle 12 in a true vertical plane, as indicated in FIGURES 1 and 2.

Located beneath the nozzle 12 is a vertically movable table 15, this table being vertically actuated by means of fluid pressure actuated cylinders 16 having upwardly projecting actuating rods 17 secured to the table 15. The table 15 is provided with a transverse slot 18 within which a freely movable plate or carrier element 19 is disposed and guided for transverse movement relative to the table for a purpose to be hereafter more fully described.

Projecting from the upper surface of the table 15 are vertical supports 20 carrying fluid actuated cylinders 21 having inwardly projecting piston rods 22 fixedly secured by suitable means, not shown, to blow mold sections 25, respectively. The blow mold sections 25 are guided for lateral movement relative to the table 15 upon actuation of the cylinders 21 by guide rods 26 joining the supports 20 and engaged by transversely projecting ears 27 mounted on the blow mold sections, respectively.

Figures 3, 5:
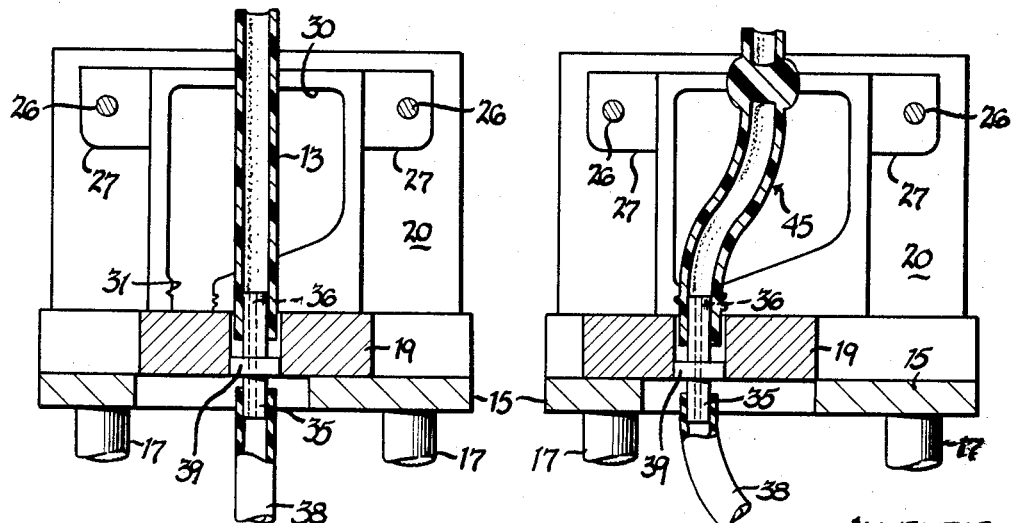
FIGURE 3 is a sectional view, taken along the plane 3—3 of FIGURE 2.
FIGURE 5 is a sectional view taken along the plane 5—5 of FIGURE 4.
Figure 4:
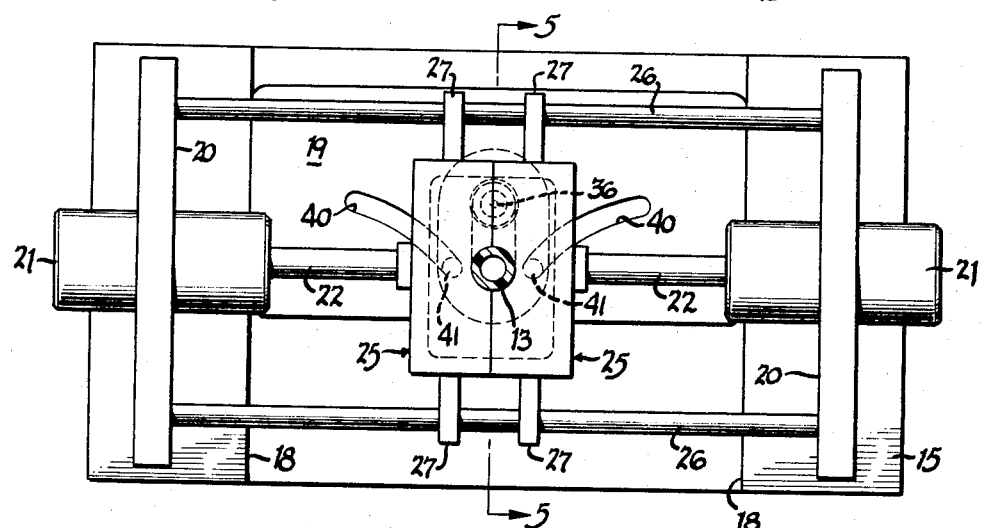
FIGURE 4 is a plan view similar to FIGURE 2 but illustrating the machine in an adjusted position.

As best shown in FIGURES 3 and 5, the blow mold sections 25 define, respectively, interior recesses 30 which cooperatively define, when the blow mold sections are closed as illustrated in FIGURE 4, an interior blow mold cavity conforming to the configuration of the final container which is desired.

It will be noted from FIGURE 3 that the cavity 23 of each section 25 includes a lower finish-defining recess 31 which is eccentric with respect to the body container, i.e. the recesses 31 are each transversely offset from the vertical centerline of the container which is to be formed, whereas the longitudinal axis of the tube 13, as extruded, coincides with the vertical centerline of the container, as is clearly shown in FIGURE 3.

The plate 19, carried by the tablet 15, carries a centrally located, vertically projecting tubular blow pin or blow tube 35 secured to the plate 19 by a spider or support collar 39. The blow pin 35 is provided with a central vertical air passage 36 which extends through the upper end 37 of the pin, projecting vertically above the plane of the upper surface of the plate 19. This pin end 37 has an exterior diameter which is substantially the same as, or somewhat less than, the interior diameter of the extruded tube 13 to freely receive, in telescopic relation thereabout, the free lower end of the tube 13. Telescoped onto the lower end of the blow pin 35 is a fluid conduit 38 connected to a source of a blowing medium, such as air, under pressure.

The exposed upper surface of the plate 19 is provided with a pair of arcuate cam grooves or recesses 40 into which depend cam pins or rollers 41 which are secured to the undersurfaces of the blow mold sections 25, respectively. These cam grooves 40 are outwardly divergent, as best illustrated in FIGURES 2 and 3, to an extent such that when the blow mold sections 25 are fully retracted to the positions illustrated in FIGURES 1, 2 and 3, the transversely movable plate 19 is located such that the blow pin 35 is aligned with the vertical centerline of the freely pendant tube 13. The cam grooves are convergent in a direction away from the location of the finish-defining recesses 31 of the blow mold sections 25 so that, when the blow mold sections are actuated by the cylinders 21 to their closed or inner positions of FIGURES 4 and 5, the plate is actuated transversely toward the finish-defining recesses 31.

Thus, in the embodiment of the invention heretofore described, closure of the blow molds actuates the blow pin and the lower end of the parison engaged thereby transversely between the closing blow mold sections 25. Such actuation deflects the lower end of the parison or tube 13 from its initial position in FIGURES 1 and 3, i.e., a truly vertical position aligned with the orifice of the extrusion nozzle 12, to an angular position at which the lower end of the parison and the blow pin 35 are aligned with the mold recesses 31 to be positioned therein when the blow mold sections 25 are fully closed, as illustrated in FIGURES 4 and 5.

Thus, the operation of the device as heretofore described will be readily apparent. Briefly, the preferred operation initially elevates the table 15 to the position of FIGURE 1 at which the table is spaced from the extrusion nozzle 12, so that the parison tube 13 is extruded downward with the lower end telescopically engaging the upper extremity 37 of the blow pin 35. After the blow mold sections 25 are closed on the tube 13 (as hereinafter more fully described) and the tube 13 is cut by the knife 13a, the table 15 is retracted downwardly by the cylinders 16 to accommodate the issuance of a subsequent tube 13 from the orifice.

While the blow mold sections 25 are guided for lateral closing movement by the guide rods 26, the cam projections 14 engage the edges of the cam slot 40 to move the plate 19 transversely between the closing blow mold sections 25, as heretofore described, until the position of FIGURE 5 is attained, at which the open lower end of the tube and the inserted blow pin portion 37 are aligned with the finish-defining recesses 31. Of course, closure of the blow molds onto the tube 13 closes the tube, as at 42, by merely pinching the tube shut, thereby forming the tube into a blowable bubble or parison, indicated generally at 45, this bubble being generally tubular in configuration and extending diagonally across the mold recess 30.

Thus, to the greatest possible extent, the tubular parison is disposed in a central position with respect to the walls of the non-symmetrical mold cavity, so that with the subsequent blowing operation the degree of expansion of any particular radial plane of the parison is substantially more uniform around the entire periphery of such radial plane.

Upon the introduction of air or other blowing medium under pressure through the blow pin 35 from the conduit 38, the tubular parison 45 is inflated interiorly of the closed blow mold sections to its final configuration, thereby forming a container with an offset finish.

Figure 6:
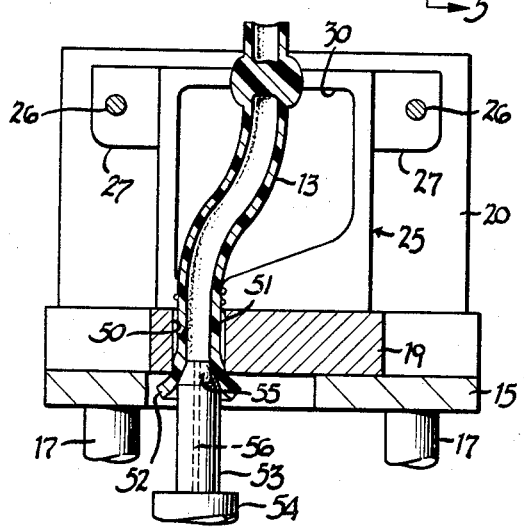
FIGURE 6 is a view similar to FIGURE 5 but illustrating the operation of a modified embodiment of the present invention.

In that embodiment of the invention illustrated in FIGURE 6 of the drawings, reference numerals identical to those utilized in FIGURES 1 through 5 refere to identical portions of the apparatus. Essentially the same blow mold structure, the same table 15, and the same shiftable plate 19 are utilized, with the exception that the plate 19 is provided with a vertically extending aperture 50 extending throughout the vertical dimension of the plate 19 to receive therein the lower end of the tube 13, as indicated at 51. The tube, as extruded, depends vertically from the orifice nozzle and merely enters the aperture 50 while the plate is positioned in alignment with the extrusion nozzle. Next, closure of the blow mold sections displaces the plate and the tube engaged thereby transversely, as hereinbefore described. Such transverse displacement of the tube aligns the lower extremity 52 of the tube 13, which projects beneath the plate 19, with a vertically movable blow pin 53 actuated by a fluid pressure cylinder 54 for extension to its position illustrated in FIGURE 6, so that the tapered upper extremity 55 of the blow pin extends into the open lower end 52 of the tube. Air then introduced through the blow pin air passage 56 will inflate the tubular parison in the manner heretofore described in detail.

The essential difference between the embodiment of the invention illustrated in FIGURES 1 through 5 and that embodiment of the invention illustrated in FIGURE 6 is that the blow pin of FIGURES 1 through 5 moves transversely with the plate, whereas the blow pin of FIGURE 6 moves only vertically and the tube 13 is deflected into alignment with the blow pin.

In the production of jugs or other handled ware, the extruded tube 13 will, of course, be of much greater diameter in order that a portion of the tube can be pinched shut by the handle-defining portions of the blow mold sections. To adapt the invention to the manufacture of such ware requiring extruded tubes of greater diameter, the blow pin 35 will engage only one side of the tube end extruded thereover. Even such limited engagement will be effective to offset the bottom end of the tube to position the tubular parison into substantial alignment with the center of the non-symmetrical mold cavities.

While two exemplary embodiments of the invention have been described in detail, it will be apparent to thoes skilled in the art that the disclosed embodiments may be modified. Therefore, the foregoing description is to be considered exemplary rather than limiting, and the true scope of the invention is that defined in the following claims.

I claim:

1. In an apparatus for making a container having an offset finish from an initially vertically extruded plastic tube depending from an extruder nozzle and including a pair of blow mold sections underlying said nozzle, said blow mold sections being relatively movable in a first linear path between a separated position for receiving said tube therebetween and a closed position to enclose the tube, said sections having lower finish-defining recesses transversely spaced from the tube as extruded, the combination therewith of a carrier underlying said blow mold sections having means for receiving and retaining the lower free end of said tube when extruded, means mounting said carrier for horizontal movement in a second linear path angularly related to said first linear path, said carrier being movable in said second path from a centered position under said blow molds to an offset position wherein said free end of said tube is in registry with said finish-defining recesses, a camming member carried by each of said blow mold sections, camming surfaces on said carrier engaged by said camming members respectively, said camming surfaces and said camming members being arranged to position said carrier at said centered position when said blow mold sections are open and to shift said carrier to said offset position when said blow molds are closed, and power means for moving said blow molds in said first linear path to their closed position and said camming members and said camming surfaces shifting said carrier in said second linear path to said offset position before closure of said blow mold sections on said tube to thereby simultaneously shift said carrier with said tube end to said offset position by the cooperation of said camming members and said cam surfaces.

2. The apparatus as claimed in claim 1 in which said camming members compries projections extending from said blow mold sections into engagement with said camming surfaces.

3. The apparatus as claimed in claim 2 in which said camming surfaces comprise sides of slanting slots formed in said carrier.

4. The apparatus as claimed in claim 1 in which said carrier has an upwardly projecting blow pin receiving the lower end of said tube and shiftable with said carrier into registry with said finish-defining recesses to permit blowing of said tube with said carrier in said offset position thereof.

References Cited

UNITED STATES PATENTS

| 2,978,745 | 4/1961 | Langecker | 264—99 |
| 3,040,376 | 6/1962 | Elphee | 264—161 |
| 3,000,051 | 9/1961 | Schaich | 264—99 |
| 3,106,745 | 10/1963 | King. | |
| 3,122,596 | 2/1964 | Stenger et al. | 264—98 |

FOREIGN PATENTS

| 1,295,535 | 5/1962 | France. |
| 1,130,996 | 6/1962 | Germany. |

ROBERT F. WHITE, *Primary Examiner.*

A. R. NOE, *Assistant Examiner.*